(12) United States Patent
Horn

(10) Patent No.: US 6,556,670 B1
(45) Date of Patent: Apr. 29, 2003

(54) METHOD FOR SOLVING THE MUSIC-ON-HOLD PROBLEM IN AN AUDIO CONFERENCE

(75) Inventor: David N. Horn, Summit, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/138,001

(22) Filed: Aug. 21, 1998

(51) Int. Cl.[7] ............................................. H04M 3/42
(52) U.S. Cl. ............................ 379/202.01; 379/204.01; 379/206.01; 379/158
(58) Field of Search ........................ 379/284, 201–206, 379/88.16, 265, 266, 88.21, 88.24, 28, 355, 215.01, 207, 158, 202.01, 203.01, 205.01, 206.01; 370/260–263, 390, 267, 450; 358/434; 364/528.21; 348/15; 345/330, 150; 704/233, 214, 221, 226

(56) References Cited

U.S. PATENT DOCUMENTS

| | | | |
|---|---|---|---|
| 4,479,211 A | * 10/1984 | Bass et al. ................... 370/62 |
| 4,544,804 A | * 10/1985 | Herr et al. ............. 379/204.01 |
| 5,495,522 A | * 2/1996 | Allen et al. .................. 379/202 |
| 5,548,638 A | * 8/1996 | Yamaguchi et al. ........ 379/202 |
| 5,657,096 A | * 8/1997 | Lukacs ........................ 348/585 |
| 5,701,340 A | 12/1997 | Zwick ................... 397/204.01 |
| 5,793,415 A | * 8/1998 | Gregory, III et al. ......... 348/15 |
| 5,953,049 A | * 9/1999 | Horn et al. .............. 348/14.09 |
| 5,991,374 A | * 11/1999 | Hazenfield ............. 379/101.01 |
| 6,020,916 A | * 2/2000 | Grezberg et al. ............ 348/15 |
| 6,148,068 A | * 11/2000 | Lowery et al. .............. 379/202 |
| 6,349,136 B1 | * 2/2002 | Light et al. ............. 379/202.01 |

FOREIGN PATENT DOCUMENTS

| JP | 9107407 | 4/1997 | ............. H04M/3/56 |
| WO | WO-00-72563 A1 | * 11/2000 | ............. H04M/3/56 |

OTHER PUBLICATIONS

Dana Blankenhorn, Editorial—Audio News Conferences, Newsbytes News Network, Jun. 16, 1994.*

Horn, David N. and Sharma, Atul, "A Versatile Audio Bridge for Multimedia Conferencing", Jan. 1994, IEEE Communicatons, ICC 94, SUPERCOMM/ICC 94, vol. 3. pp. 1754–1762.*

European Search Report; EP 99 30 6306; Sep. 24, 2001.

* cited by examiner

Primary Examiner—Fan Tsang
Assistant Examiner—Ovidio Escalante
(74) Attorney, Agent, or Firm—Dickstein, Shapiro, Morin & Oshinsky, LLP; James DiGiorgio

(57) ABSTRACT

A solution to the music-on-hold problem associated with audio conference calls. The music on-hold-problem occurs when a conferee having music-on-hold puts the conference call on hold, resulting in a continuous stream of music being transmitted to the other conferees. Such a conferee is called an offending conferee. The solution presented herein is to prevent music-on-hold signals emanating from an offending conferee from being passed through an audio conference bridge to the other conferees. This is accomplished, in particular embodiments, by directing a merging/summing subsystem of the audio conference bridge to temporarily stop combining audio emanating from the offending conferee from being combined or merged onto audio channels through which the other conferees communicate on the audio conference. Once the music-on-hold is terminated, the offending conferee can rejoin conference call by sending a signal that directs the merging/summing subsystem to resume the combining of audio signals emanating from the offending conferee onto the audio channels of the other conferees.

26 Claims, 2 Drawing Sheets

METHOD FOR SOLVING THE MUSIC-ON-HOLD PROBLEM IN AN AUDIO CONFERENCE

FIELD OF THE INVENTION

The present invention relates to the field of telecommunications, and more particularly to a method for solving the "music-on -hold" problem associated with conference calls.

BACKGROUND OF THE INVENTION

Conference call is a feature provided by many telecommunications systems. This feature interconnects a plurality of parties, called conferees, in such a way that they can all speak with one another at the same time.

The part of the telecommunications system which implements this feature is hereinafter referred to as the "audio conference bridge". Typically, the audio conference bridge of a telecommunications system is incorporated into a PBX or a network switch. In some systems, however, an audio conference bridge may be provided by a device or system that is completely separate and distinct from a PBX or a network switch. No matter what part of a system the audio conference bridge is incorporated into, a conference call is typically established by connecting each conferee to the audio conference bridge through an audio channel, where each audio channel is composed of an incoming audio channel and an outgoing audio channel. The outgoing audio channel carries audio from the conferee's terminal equipment to the audio conference bridge, and the incoming audio channel carries audio from the audio conference bridge to the conferee's terminal equipment. As a result, during a conference call, audio travels from the terminal equipment of a particular conferee through its outgoing audio channel to the audio conference bridge which merges and/or combines the audio onto the incoming audio channels connected to the other conferees, thereby enabling the particular conferee to send audio or speak to all the other conferees at the same time.

A problem that occurs in conference calls is the so-called music-on-hold problem. This problem occurs when a conferee who has an active music-on-hold feature puts the conference call on hold to, for example, answer another incoming call, at which point the other conferees are subjected to a stream of music that continuously interferes with their audio conference. A conferee who causes such a continuous stream of music is considered to "offend" the conference call, and thus is referred to herein as the "offending conferee". And, the audio channel through which the offending conferee's terminal equipment transmits the music-on-hold signals to the conference bridge is referred to herein as the "offending audio channel."

The conventional solution to the music-on-hold problem is to drop the offending conferee from the conference call by disconnecting the offending audio channel from the audio conference bridge. The disconnect of the offending audio channel results in a permanent disconnect of the offending conferee from the communications system. Such a permanent disconnect is not always desirable because the offending conferee may still have had a useful role to play in the conference call. Moreover, later reconnecting the offending conferee may require that one of the remaining conferees take the time to re-activate the conference call feature and re-dial the offending conferee's number, and/or seek operator assistance to establish a new audio channel between the offending conferee's terminal equipment and the audio conference bridge.

SUMMARY OF THE INVENTION

The present invention is a method and apparatus for preventing music-on-hold signals from being transmitted from an offending conferee to the other conferees without having to permanently disconnect the offending audio channel from an audio conference bridge. Instead, the music-on-hold signals transmitted on the offending audio channel by the offending conferee are prevented from being merged onto the audio channels connecting the other conferees to the audio conference bridge, thereby preventing the offending conferee from communicating on the audio conference. The term "music-on-hold signals" as used herein includes music and talk-radio signals generated by a radio station. When the offending conferee terminates music-on-hold, the audio transmitted by the offending conferee can then again be merged on to the audio channels connecting the other conferees to the conference bridge, thereby re-joining the offending conferee to the audio conference. Advantageously, the present invention eliminates the music-on-hold problem while enabling the offending conferee to rejoin the audio conference without operator assistance and without interrupting the other conferees.

In particular embodiments, the apparatus is an audio conference bridge that has a merging/summing subsystem, a music detector, a central processing unit, a message generator, and a touch-tone detector. The merging/summing subsystem is operable to take audio transmitted from a conferee's terminal equipment through its outgoing audio channel to the audio conference bridge, and merge that audio onto the audio channels connecting the other conferees to the audio conference bridge. Such a merging/summing subsystem is presently part of and/or utilized by conventional audio conference bridges. The music detector is operable to monitor the audio signals transmitted from each conferee on its respective audio channel and detect the presence of music-on-hold signals thereon. This function can be performed, for example, by an energy monitor which is a standard component of conventional audio conference bridges. The central processing unit is operable to direct the merging/summing subsystem to stop combining audio from an offending conferee onto the audio channels connecting the other conferees to the audio conference bridge, thereby preventing the offending conferee from communicating on the audio conference. The message generator is operable to inform the offending conferee that he/she has been temporarily disconnected from the audio conference due to music-on-hold, and for informing the offending conferee which touch-tones to press to rejoin the conference. The touch tone detector is operable to detect touch tone signals transmitted by the conferees on their respective audio channels.

In particular embodiments, the just-described audio conference bridge is operable to provide a graphical user interface (GUI) through the terminal equipment of one or more of the conferees. The GUI, in accordance with the principles of the present invention, may include, for example, graphical representations of the conferees, graphical representations of the sound level control of the audio received from each conferee, and graphical representations of anti-music-on-hold buttons associated with each conferee. Activating or selecting the graphical representation of the anti-music-on-hold button associated with an offending conferee informs or signals the audio conference bridge to prevent audio from the offending conferee from being merged onto the audio channels connecting the other conferees to the audio conference bridge, as described above. When this happens, the audio conference bridge is operable to activate the message generator which plays a message to inform the offending conferee that he/she has been temporarily disconnected from the conference, activate the touch-tone detector which detects whether a reconnect signal has been sent from the offending conferee, and automatically reconnect the offending conferee to the audio conference when the reconnect signal is detected.

These and other features of the invention will become more apparent from the detailed description when taken with the drawings. The scope of the invention, however, is limited only by the claims.

BRIEF DESCRIPTION OF THE DRAWING(s)

DETAILED DESCRIPTION OF ILLUSTRATIVE EMBODIMENTS OF THE INVENTION

Figure 1:
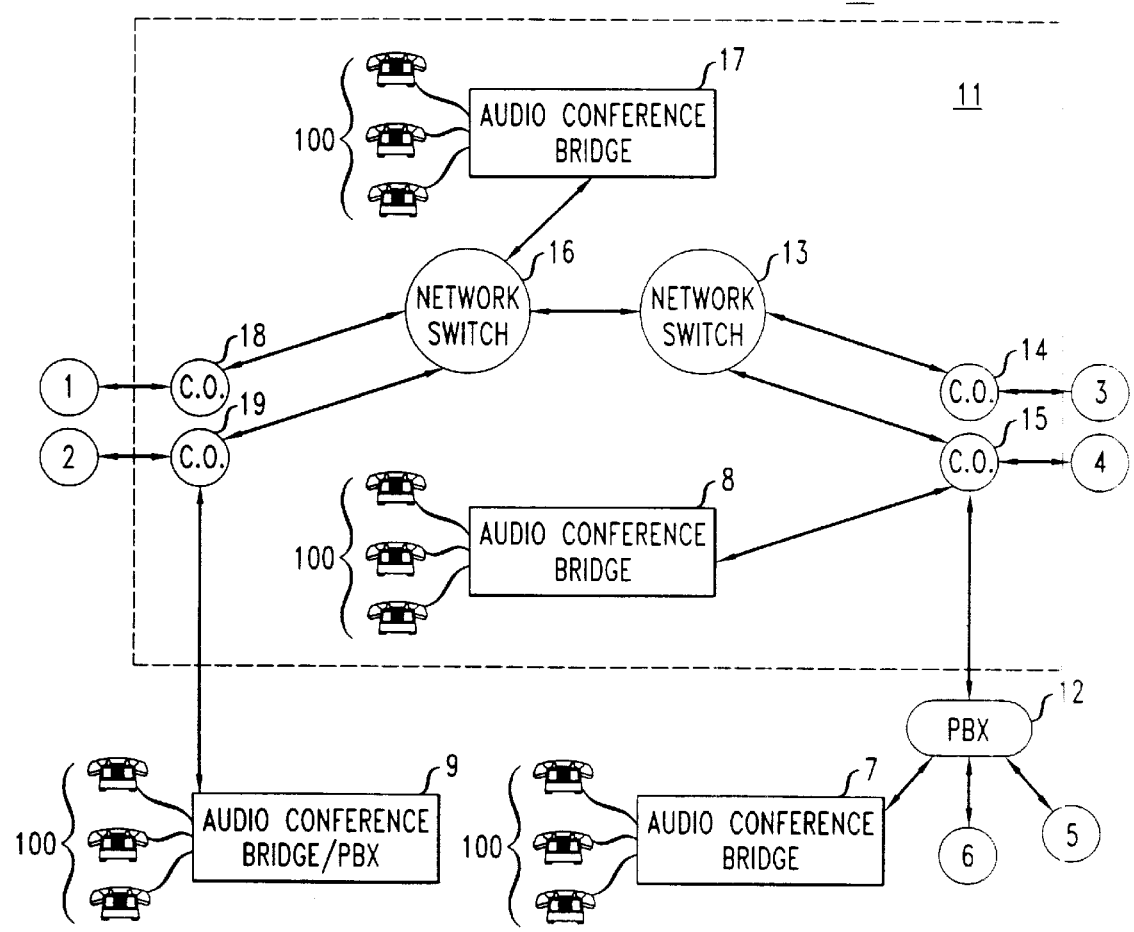
FIG. 1 is a block diagram of a conventional telecommunications system having an audio conference bridge operable to solve the music on hold problem associated with conference calls in accordance with the principles of the present invention.

Referring now to FIG. 1 there is shown an illustrative embodiment of a telecommunications system 10 having audio conference bridges 7, 8 and 17 and audio conference bridge/PBX 9, each of which is individually operable to solve the music-on-hold problem associated with conference calls in accordance with the principles of the present invention. As shown, telecommunications system 10 has a public-switched-telephone-network (PSTN) 11 connected to a PBX 12 and an audio conference bridge/PBX 9. The public-switched-telephone-network 11 has a network switch 13 connected to a network switch 16 and central offices 14 and 15. Network switch 16 is connected to audio conference bridge 17 and central offices 18 and 19. Central offices 18, 19, 14 and 15 are connected to conferees 1–4, respectively. Central office 15 is further connected to audio conference bridge 8 and PBX 12. Central office 19 is further connected to audio conference bridge/PBX 9. PBX 12 is connected to audio conference bridge 7 and conferees 5 and 6. Each of audio conference bridges 7, 8 and 17 and audio conference bridge/PBX 9 are connected to local phones 100.

In operation, telecommunications system 10 is operable to set up a conference call between conferees 1–6 in a conventional manner. To illustrate, each conferee 1–6 first dials a phone number that directs the telecommunications system to connect the conferees through one of audio conference bridges 7, 8, 17 and/or audio conference bridge/PBX 9. Since each of audio conference bridges 7, 8, 17 and audio conference bridge/PBX 9 are each operable to provide a conference call in accordance with the principles of the present invention, it is assumed, for purposes of explanation, that telecommunications system 10 connects conferees 1–6 through audio conference bridge 17. That is, when each conferee 1–6 dials the conference call phone number, it is assumed herein that telecommunications system 10 connects the terminal equipment of each conferee 1–6 to audio conference bridge 17 through an available audio channel. Once connected to audio conference bridge 17, each conferee 1–6 is requested to send, over its audio channel, a touch-tone code or password indicating that the conferee wishes to join the audio conference. As the touch-tone code is received from the conferees 1–6, audio conference bridge 17 connects the conferees 1–6 to the requested audio conference so that conferees 1–6 can speak with one another at the same time.

The manner by which audio conference bridge 17 connects conferees 1–6 to the requested audio conference is known. Briefly, the audio transmitted by each conferee is merged or combined onto the audio channels of every other conferee so that each conferee can speak and listen to every other conferee. Such a merging or combining of the audio can be provided by a conventional merging/summing subsystem as utilized in conventional audio conference bridges. It is the merging/summing subsystem of audio conference bridge 17 that actually maintains the audio conference between conferees 1–6.

Once an audio conference is established for conferees 1–6, if one of the conferees has an active music-on-hold feature and puts the audio conference on hold, then that conferee, called the offending conferee, will transmit music-on-hold signals on the audio channel connecting the offending conferee to audio conference bridge 17. When this happens, audio conference bridge 17 in accordance with the principles of the present invention is operable to prevent the music-on-hold signals from being merged by its merging/summing subsystem onto the audio channels connecting the other conferees to audio conference bridge 17, thereby preventing the other conferees from receiving the music-on-hold signals during the audio conference.

Figure 2:
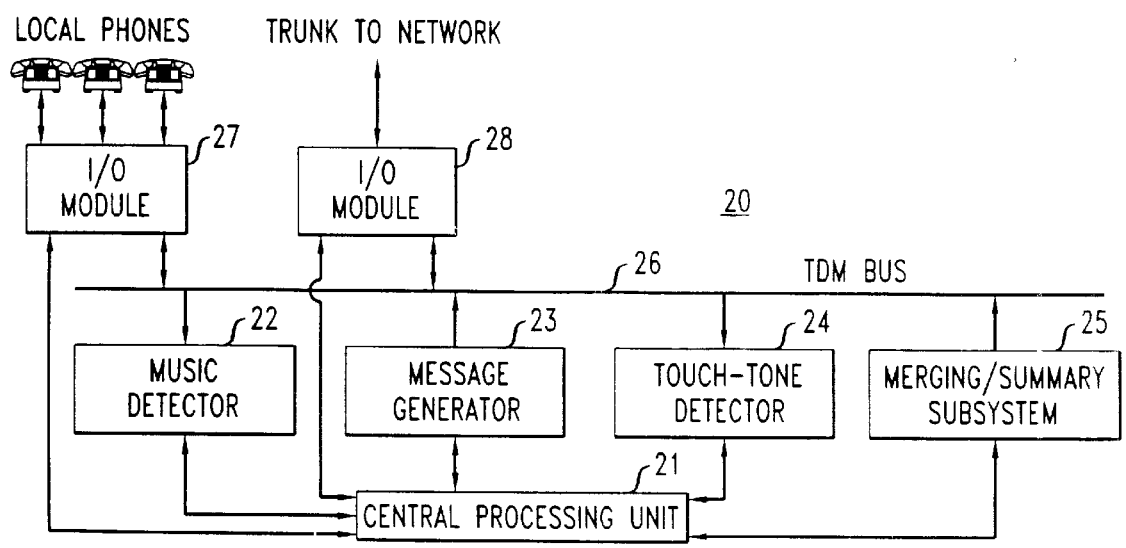
FIG. 2 is a block diagram of an illustrative embodiment of the audio conference bridge shown in FIG. 1.

The manner by which audio conference bridge 17 (and thus audio conference bridges 7 and 8, and audio conference bridge/PBX 9) provides the just-described operability in accordance with the principles of the present invention can be explained by describing the operation of a more detailed embodiment of audio conference bridge 17. Referring now to FIG. 2 there is shown an illustrative embodiment of a more detailed version of audio conference bridge 17, hereinafter referred to as audio conference bridge 20. As shown, audio conference bridge 20 has a central processing unit 21 connected to a music detector 22, a message generator 23, a touch-tone detector 24 and a merging/summing subsystem 25. Music detector 22, message generator 23, touch-tone detector 24 and merging/summing subsystem 25 are each connected to a time-division multiplexed (TDM) bus 26 which, in turn, is connected to input/output (I/O) modules 27 and 28. I/O module 27 has an interface for connecting TDM bus 26 to local phone lines, and I/O module 28 has an interface for connecting TDM bus 26 to the trunk lines of a telecommunications system (e.g., the trunk lines connecting audio conference bridge 17 to network switch 16, as shown in FIG. 1).

In operation, audio channels connecting a plurality of conferees to audio conference bridge 20 are coupled from local phone lines and/or network switches to TDM bus 26 through I/O modules 27 and 28. That is, the incoming audio channels containing audio transmitted from the conferees to audio conference bridge 20 are coupled to TDM bus 26, and outgoing audio channels containing audio being transmitted to the conferees from audio conference bridge 20 are coupled from TDM bus 20 to the local phones lines and/or the trunk lines of the telecommunications system to which audio conference bridge 20 is connected. When music detector 22 detects that an incoming audio channel connecting one of the conferees to audio conference bridge 20 contains music-on-hold signals, music detector 22 identifies the audio channel on which the music-on-hold is detected, and reports the identified audio channel to central processing unit 21. Central processing unit 21 then directs merging/summing subsystem to stop merging audio from the identified audio channel, or offending audio channel, onto the audio channels connecting the other conferees to the audio conference bridge, and to stop merging audio from all the other conferees onto the offending audio channel. Once this is done, the offending conferee will no longer be able to communicate with the other conferees, and the other conferees will no longer hear the music-on-hold signals transmitted by the offending conferee.

When this happens, central processing unit 21 directs message generator 23 to send a continuous message over the offending audio channel to inform the offending conferee that he/she has been temporarily disconnected from the conference due to the presence of music-on-hold, and that he/she can rejoin the conference by transmitting a given reconnect signal. For example, message generator 23 may continuously transmit the message "We have detected 'Music on Hold' from your line, and have temporarily disconnected you from the conference. To get back to the conference, please hit touch-tone one twice." While message generator 23 sends such a message, central processing unit 21 directs touch-tone detector 24 to continuously monitor the offending audio channel for the touch-tone, or reconnect, signal.

When touch-tone detector 24 detects the reconnect signal, it informs central processing unit 21 that the reconnect signal has been received. Central processing unit 21 then directs merging/summing subsystem 25 to resume the process of merging audio from the offending conferee onto the audio channels of all the other conferees, and vice versa. This enables the offending conferee to again speak and listen to the other conferees. As a result, in accordance with the principles of the present invention, the offending conferee can rejoin the audio conference without operator assistance and without interrupting the other conferees.

In particular embodiments, audio conference bridge 20 is operable to provide one or more conferees with a graphical user interface (GUI) that enables such conferees to control certain aspects of the conference call, and to inform or signal audio conference bridge 20 when he/she hears music-on-hold signals emanating from one of the other conferees. The audio conference bridge can provide the graphical user interface by any desired means or method including but not limited to simply sending a signal that directs the terminal equipment to locally generate and display the graphical user interface through a monitor or screen on the terminal equipment, or generating a video signal representing the graphical user interface and sending the video signal to the terminal equipment for display on a screen or monitor. Just like a computer is operable to provide a graphical user interface through a computer monitor/screen that enables a user to point and click a mouse to signal the computer to take certain actions (e.g. to open an application such as a spread sheet program), so can an audio conference bridge in accordance with the principles of the present invention be operable to provide a graphical user interface through the conferee's terminal equipment to enable the conferee to make selections that informs or signals the audio conference bridge to take certain actions. A conferee provided with such a graphical user interface is hereinafter referred to as a GUI-enhanced conferee.

Figure 3:
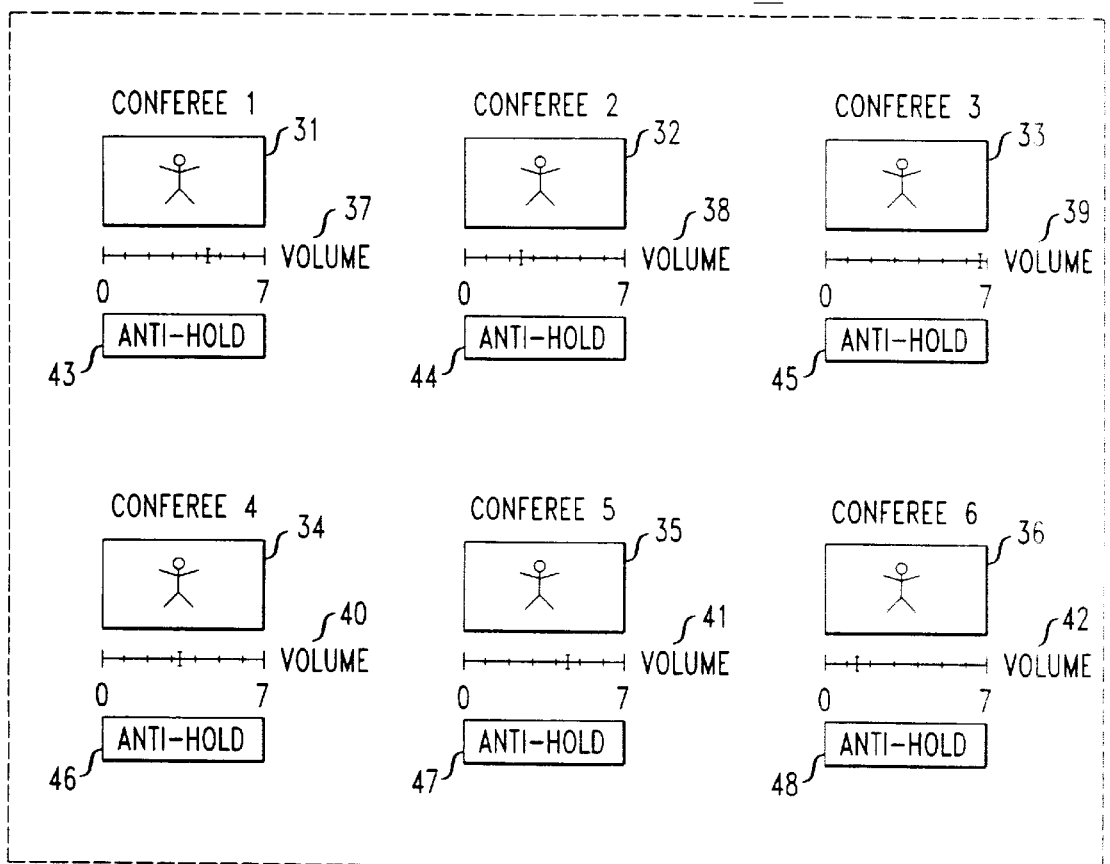
FIG. 3 is a pictorial view of an illustrative embodiment of a graphical user interface provided through the terminal equipment of one or more conferees of a conference call by the audio conference bridge shown in FIG. 2.

Referring now to FIG. 3, there is shown a pictorial view of an illustrative embodiment of a graphical user interface 30 that is provided through a monitor or screen of the terminal equipment of one or more of conferees 1–6 by audio conference bridge 20 in accordance with the principles of the present invention. As shown, graphical user interface 30 presents graphical representations 31–36 of conferees 1–6, respectively, graphical representations 37–42 of the sound level control of the audio received from each of the respective conferees 1–6, and graphical representations 43–48 of anti-music-on-hold buttons associated with each of the audio channels connecting the respective conferees 1–6 to the audio conference bridge.

In operation, when a GUI-enhanced conferee hears or detects music-on-hold signals emanating from an offending conferee during the conference call, the GUI-enhanced conferee can direct audio conference bridge 17 to prevent the music-on-hold signals from being transmitted to the other conferees by selecting a graphical representation of the anti-hold button associated with the offending conferee. For example, if the GUI-enhanced conferee determines that music-on-hold signals are emanating from the terminal equipment of conferee 1 during the conference call, he/she can direct audio conference bridge 17 to prevent the audio signals from reaching the other conferees 2–6 by selecting graphical representation 43 of the anti-hold button associated with conferee 1. The selection can be done by simply pointing and clicking a mouse on graphical representation 43 on graphical user interface 30. Such a selection informs or signals audio conference bridge 17 to prevent audio signals emanating from conferee 1 from being transmitted to the other conferees, as described above. That is, selecting representation 43 will signal audio conference bridge 17 to prevent audio signals emanating from the terminal equipment of conferee 1 from being merged onto the audio channels connecting audio conference bridge 17 to the other conferees 2–6.

While the invention has been particularly shown and described with reference to the telecommunications system shown in FIG. 1, the audio conference bridge shown in FIG. 2, and the graphical user interface shown in FIG. 3, it will be recognized by those skilled in the art that modifications and changes may be made to the present invention without departing from the spirit and scope thereof. For example, in particular embodiments, the invention may be carried-out in a PBX and/or a network switch. In such embodiments, the PBX and/or the network switch can include the components of audio conference bridge 20 or there functional equivalent. That is, a telecommunications system in accordance with the principles of the present invention can include a PBX, an audio conference bridge and/or a network switch having any desired means for solving the music-on-hold problem in accordance with the principles of the present invention.

In addition, in particular embodiments, the graphical user interface can include, for example, a representation of the type of signal emanating from each of the conferees. For example, when an audio bridge determines that a signal from a given conferee is a music-on-hold signal, the audio conference bridge can provide a GUI-enhanced conferee with a graphical representation of that signal type. In such embodiments, the audio conference bridge is operable to analyze the signals emanating from each conferee and determine its type (e.g. tones, music, speech). Such embodiments can enable a GUI-enhanced conferee to easily identify whether a given conferee is emanating music-on-hold signals, and thus easily direct the audio conference bridge to prevent the music-on-hold signals from reaching the other conferees of a conference call.

As a result, the invention in its broader aspects is not limited to specific details shown and described herein.

Various modifications may be made without departing from the spirit or scope of the general inventive concept as defined by the appended claims.

I claim:

1. An audio conference bridge operable to provide a conference call among a plurality of conferees, the audio conference bridge comprising:

a subsystem for merging audio emanating from a conferee location onto audio channels through which the audio conference bridge sends audio to the other conferee locations;

means for recognizing and preventing music-on-hold signals emanating from at least one of said conferee locations from being transmitted through the audio conference bridge to the other conferee locations during the conference call, said at least one conferee location from which music-on-hold signals emanate being an offending conferee location, wherein said means for recognizing and preventing comprises a unit operable to direct said subsystem to stop merging audio emanating from said offending conferee location onto the audio channels through which the audio conference bridge sends audio to the other conferee locations, thereby excluding signals emanating from the offending conferee location from the conference call; and a message generator operable to send a message to said offending conferee location, said message including a notification that said offending conferee location has been temporarily disconnected from the conference call.

2. The audio conference bridge of claim 1 wherein said message further comprises instructions that describe a set of actions to be taken that will cause the audio conference bridge to resume merging audio emanating from the offending conferee location onto the audio channels through which the audio conference bridge sends audio to the other conferee location, thereby rejoining the offending conferee location to the conference call.

3. The audio conference bridge of claim 2 further comprising a detector for detecting said set of actions.

4. The audio conference bridge of claim 3 wherein said means for recognizing and preventing further comprises a music detector for detecting music-on-hold signals emanating from said conferee locations.

5. The audio conference bridge of claim 4 further comprising means for providing at least one of said conferee locations with a graphical user interface through a terminal equipment at said at least one of said conferee locations.

6. The audio conference bridge of claim 5 wherein said graphical user interface includes a graphical representation of each said conferee location, a graphical representation of the sound level of audio received at said at least one of said conferee locations from the other conferee locations, and a graphical representation of an anti-hold button associated with each conferee location, each said graphical representation of an anti-hold button being operable, when selected, to signal the audio conference bridge to activate said means for recognizing and preventing music-on-hold signals emanating from the conferee location associated with said selected graphical representation of said anti-hold button to prevent the audio link from being transmitted to said other conferees.

7. A telecommunications conferencing system comprising:

a merging and/or summing subsystem for establishing a conference call among a plurality of audio links; and means for recognizing and preventing audio signals transmitted on an individual one of said audio links from being transmitted on the other audio links when said audio signals are music-on-hold signals, said audio link upon which music-on-hold signals appear being an offending audio link, said means for recognizing and preventing comprising a music detector for detecting music-on-hold signals transmitted on said audio links and a central processing unit operable to direct said merging and/or summing subsystem to stop combining audio transmitted on said offending audio link with audio transmitted on said other audio links, thereby temporarily disconnecting the offending audio link from the conference call; and a message generator capable to send a message on said offending audio link, said message including notification that said offending link has been disconnected from the conference call due to music-on-hold.

8. The telecommunication conferencing system of claim 7 wherein said message further comprises instructions that describe a set of reconnect signals that direct the telecommunication conferencing system to reconnect the offending conferee location to the conference call.

9. The telecommunications conferencing system of claim 8 further comprising a detector for detecting said reconnect signals.

10. The telecommunications conferencing system of claim 9 wherein said central processing unit is further operable to direct said merging and/or summing subsystem to resume combining audio transmitted on said offending audio link onto the other audio links in response to a reconnect signal received at said detector.

11. The telecommunication system of claim 10 further comprising means for providing a graphical user interface through terminal equipment connected to at least one of said audio links.

12. A telecommunications conferencing system comprising:

a merging and/or summing subsystem for establishing a conference call among a plurality of audio links;

means for recognizing and preventing audio signals transmitted on an individual one of said audio links from being transmitted on the other audio links when said audio signals are music-on-hold signals, said audio link upon which music-on-hold signals appear being an offending audio link; and means for providing a graphical user interface through terminal equipment connected to at least one of said audio links, wherein said graphical user interface includes a graphical representation of each said audio link, a graphical representation of the sound level of audio received from each said audio link, and a graphical representation of an anti-hold button associated with each said audio link, each said graphical representation of an anti-hold button being operable, when selected, to signal the audio conference bridge to activate said means for recognizing and preventing audio signals transmitted on the audio link associated with said selected graphical representation of said anti-hold button to prevent the audio link from being transmitted to said other conferees.

13. A method for use in an audio conference bridge which is operative to establish a conference call among a plurality of conferee locations, the method comprising the steps of:

recognizing and preventing music-on-hold signals emanating from at least one of said conferee locations from being transmitted through the audio conference bridge to the other conferee locations during the conference call and identifying said at least one of said conferee locations from which said music-on-held signals emanate as an offending conferee location;

preventing audio emanating from said offending conferee location from being combined onto audio channels through which audio is sent from the audio conference bridge to the other conferee locations, thereby disconnecting the offending conferee location from the conference call; and sending a message to said offending conferee location, said message including a notification that said offending conferee location has been temporarily disconnected from the conference call due to music-on-hold.

14. The method of claim 13 wherein said message further comprises instructions that describe a set of reconnect signals that will instruct the audio conference bridge to reconnect the offending conferee location to the conference call.

15. The method of claim 14 further comprising the step of combining audio emanating from said offending conferee location after at least one of said set of reconnect signals is sent to said audio conference bridge.

16. The method of claim 15 further comprising the step of providing at least one of said conferee locations with a graphical user interface through a terminal equipment located at said at least one of said conferee locations.

17. A method for use in an audio conference bridge which is operative to establish a conference call among a plurality of conferee locations, the method comprising the steps of:

recognizing and preventing music-on-hold signals emanating from at least one of said conferee locations from being transmitted through the audio conference bridge to the other conferee locations during the conference call;

providing at least one of said conferee locations with a graphical user interface through a terminal equipment located at said at least one of said conferee locations, wherein said graphical user interface includes a graphical representation of each said audio link, a graphical representation of the sound level of audio received from each said conferee location, and a graphical representation of an anti-hold button associated with each said conferee location, each said graphical representation of an anti-hold button being operable, when selected, to signal the audio conference bridge to activate said step of recognizing and preventing music-on-hold signals emanating from the conferee location associated with said selected graphical representation of said anti-hold button to prevent the audio link from being transmitted to said other conferees.

18. A method for use in a telecommunications conferencing system which is operative to establish a conference call among a plurality of audio links, the method comprising the steps of:

recognizing and preventing audio signals transmitted on an individual one of said audio links from being transmitted on the other audio links when said audio signals are music-on-hold signals, wherein said step of recognizing and preventing comprises the step of identifying an audio link, on which said music-on-hold signals are transmitted, as an offending audio link, and preventing audio transmitted on said offending audio link from being combined onto the other audio links, thereby temporarily disconnecting the offending audio link from the conference call; and combining audio transmitted on said offending audio link onto the other audio links ill response to a reconnect signal.

19. The method of claim 18 further comprising a step of sending a message to an offending conferee associated with said offending audio link, said message including a notification that said offending conferee has been temporarily disconnected from the conference call.

20. The method of claim 19 wherein said message further comprises instructions that describe a set of reconnect signals that will instruct said offending conferee to provide a reconnect signal.

21. The method of claim 19 wherein said step of sending a message is accomplished by a message generator.

22. The method of claim 18 further comprising providing at least one conferee associated with at least one of said audio links with a graphical user interface through a terminal equipment.

23. The method of claim 22 wherein said graphical user interface includes a graphical representation of each said audio link, a graphical representation of the sound level of audio received from each said audio link, and a graphical representation of an anti-hold button associated with each said audio link, each said graphical representation of an anti-hold button being operable, when selected, to signal an audio conference bridge to activate a means for recognizing and preventing audio signals transmitted on the audio link associated with said selected graphical representation of said anti-hold button to prevent the audio link from being transmitted to said other conferees.

24. The method of claim 18 wherein said conference call is established by an audio conference bridge.

25. The method of claim 24 wherein said audio conference bridge establishes said conference call using a subsystem for merging said audio signals.

26. The method of claim 18 wherein said reconnect signal is a touch-tone signal transmitted on the offending audio link.

* * * * *